(12) United States Patent
Ittycheriah et al.

(10) Patent No.: US 6,185,530 B1
(45) Date of Patent: Feb. 6, 2001

(54) APPARATUS AND METHODS FOR IDENTIFYING POTENTIAL ACOUSTIC CONFUSIBILITY AMONG WORDS IN A SPEECH RECOGNITION SYSTEM

(75) Inventors: Abraham Ittycheriah; Stephane H. Maes, both of Danbury, CT (US)

(73) Assignee: International Business Machines Corporation, Armonk, NY (US)

( * ) Notice: Under 35 U.S.C. 154(b), the term of this patent shall be extended for 0 days.

(21) Appl. No.: 09/134,582

(22) Filed: Aug. 14, 1998

(51) Int. Cl.[7] ............................... G10L 5/06; G10L 9/00; G06F 17/00
(52) U.S. Cl. .................... 704/255; 704/251; 704/243; 707/5; 707/6

(56) References Cited

U.S. PATENT DOCUMENTS

| | | | |
|---|---|---|---|
| 4,829,576 | * 5/1989 | Porter | 381/44 |
| 4,918,732 | 4/1990 | Gerson et al. | |
| 5,033,087 | * 7/1991 | Bahl et al. | 381/43 |
| 5,218,668 | 6/1993 | Higgins et al. | |
| 5,349,645 | * 9/1994 | Zhao | 704/243 |
| 5,621,857 | 4/1997 | Cole et al. | |
| 5,625,748 | 4/1997 | McDonough et al. | |
| 5,675,704 | 10/1997 | Juang et al. | |
| 5,680,511 | 10/1997 | Baker et al. | |
| 5,715,367 | 2/1998 | Gillick et al. | |
| 5,752,001 | 5/1998 | Dulong | |
| 5,778,344 | 7/1998 | Attwater et al. | |
| 5,850,627 | 12/1998 | Gould et al. | |
| 5,852,801 | * 12/1998 | Hon et al. | 704/244 |
| 5,864,810 | 1/1999 | Digalakis et al. | |
| 6,005,549 | 12/1999 | Forest | |
| 6,023,673 | 2/2000 | Bakis et al. | |

* cited by examiner

*Primary Examiner*—Krista Zele
*Assistant Examiner*—Robert Louis Sax
(74) *Attorney, Agent, or Firm*—F. Chau & Associates, LLP (57) ABSTRACT

A method of determining potential acoustic confusion between at least one new word and at least a portion of existing words of a vocabulary of a speech recognition engine comprises the steps of: a user inputting the at least one new word; computing respective measures between the at least one new word and the at least a portion of existing vocabulary words, the respective measures indicative of acoustic similarity between the at least one word and the at least a portion of existing words; if at least one measure is within a threshold range, indicating results associated with the at least one measure and prompting the user to input an alternative word or additional information pertaining to the at least one new word; and if no measure is within the threshold range, adding the at least one new word to the vocabulary.

29 Claims, 3 Drawing Sheets

APPARATUS AND METHODS FOR IDENTIFYING POTENTIAL ACOUSTIC CONFUSIBILITY AMONG WORDS IN A SPEECH RECOGNITION SYSTEM

CROSS REFERENCE TO RELATED APPLICATIONS

This application is being filed concurrent with U.S. patent application docket no. YO998-045 (728-108) entitled "APPARATUS AND METHODS FOR IDENTIFYING HOMOPHONES AMONG WORDS IN A SPEECH RECOGNITION SYSTEM" and U.S. patent application docket no. YO998-046 (728-109) entitled "APPARATUS AND METHODS FOR REJECTING CONFUSIBLE WORDS DURING TRAINING ASSOCIATED WITH A SPEECH RECOGNITION SYSTEM".

BACKGROUND OF THE INVENTION

The invention relates to speech recognition and, more particularly, to apparatus and methods for identifying potential acoustic confusibility among words.

Many existing and proposed speech recognition-based systems which employ speech signals as inputs to the system provide the capability for the user to customize the speech recognition vocabulary associated with the system. In particular, application developers using a speech recognition engine typically want to be able to expand the recognition vocabulary of the system. In the case where the speech recognition system is used to provide command or control functions to some other application (e.g., voice dialing, security access authorization, etc.), expanding the vocabulary effectively results in an expansion of the set of command words and phrases which the user may employ to command and control the particular application. Unfortunately, while methods for such expansion are known, some are more appropriate than others. Some choices are inherently wrong because they are more prone to acoustic confusion. Acoustic confusion is the situation where a word or phrase uttered by a user is mis-recognized due to its acoustic similarity to another word or phrase in the speech recognition vocabulary. Minimization of acoustic confusion is especially important for command and control interfaces implemented with speech recognizers which inherently have some non-zero, but finite, error rate.

Application developers typically do not desire to gain in-depth understanding into the capabilities of the recognition engine when seeking to expand the command sets employed in their applications. Unfortunately, the choice of optimal vocabulary expansion often requires some experience regarding the capabilities of the recognition engine. However, it is generally very difficult to determine which words are, or will be, confusible for a speech recognition engine.

With the advent of large vocabulary name recognition employing speech, the problem of resolving which particular spelling of a word was intended by the speaker, when many possible spellings exist within the vocabulary, has added to the difficulty. For example, the two words "waste" and "paste" may be poor choices for commands due to the potential confusion in decoding these similarly sounding uttered words. However, replacing the word "waste" by "erase", "delete", "eliminate", "cut", or even "trash", results in much better discriminant capabilities.

Furthermore, many words result in the same baseforms which are somewhat arbitrarily treated by the speech recognizer, at least at the acoustic level. While language modeling and contexts can help in dictation and conversation tasks, in command and control decoding, acoustics are still one of the most important parameters. The problem of recognition inaccuracy due to acoustic confusion is often tackled by hand editing the speech recognition vocabulary file to remove such potential problems. However, this hand-editing method is not possible if large lists of commands and words are to be automatically incorporated by non-specialists (i.e., persons with little or no in-depth understanding of recognition engine operations and capabilities) into the vocabulary of the recognizer.

This problem exists in other speech recognition areas and up to now has been corrected by using a manual approach or using the context in which the command or word is used in order to resolve the command or word. For example, the words "to", "two" and "too" are typical examples of confusible words. The approach to detect which one of these words was actually meant when uttered by a speaker has traditionally been to use the context around the word. Some recognizers may even be capable of intelligently noting that the distance of the spoken speech to all of these words will be the same and thus may prevent such extra scoring by first noting that all three may have the same baseform.

Accordingly, it would be desirable to provide a method and apparatus for relieving the recognizer from performing acoustic confusibility checks and for informing users, such as, for example, application developers, of potential problems. The developer would then be able to decide to use a synonym, coerce the grammar, modify the interface (e.g., provide capability for asking user to confirm the command) or modify the set of options in that particular context (e.g., limit the active vocabulary to exclude the competing commands). Also, it would be quite valuable to employ a tool for automatically evaluating the effect of vocabulary expansion on the acoustic performance of the speech recognizer without the need to build a new vocabulary and perform recognition tests.

SUMMARY OF THE INVENTION

This invention provides methods and apparatus to automatically build a set of acceptable words or commands for a voice controlled system, in a given environment, by warning the user of possible confusible sets.

In one aspect of the invention, a method of determining potential acoustic confusion between at least one new word and at least a portion of existing words of a vocabulary of a speech recognition engine comprises the steps of: a user inputting the at least one new word; computing respective measures between the at least one new word and the at least a portion of existing vocabulary words, the respective measures indicative of acoustic similarity between the at least one word and the at least a portion of existing words; if at least one measure is within a threshold range, indicating results associated with the at least one measure and prompting the user to input an alternative word or additional information pertaining to the at least one new word; and if no measure is within the threshold range, adding the at least one new word to the vocabulary.

In another aspect of the invention, computer-based apparatus for determining potential acoustic confusion between at least one new word and at least a portion of a vocabulary of a speech recognition engine comprises: an input device for permitting a user to input the at least one new word; a processor, operatively coupled to the input device, for computing respective measures between the at least one new word and the at least a portion of existing vocabulary words, the respective measures indicative of acoustic similarity between the at least one new word and the at least a portion of existing vocabulary words; and an output device operatively coupled to the processor; if at least one measure is within a threshold range, the processor causing indication in accordance with the output device of results associated with the at least one measure and prompting the user to input an alternative word or additional information pertaining to the at least one new word; if no measure is within the threshold range, the processor causing addition of the at least one new word to the vocabulary.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF PREFERRED EMBODIMENTS

Figure 1:
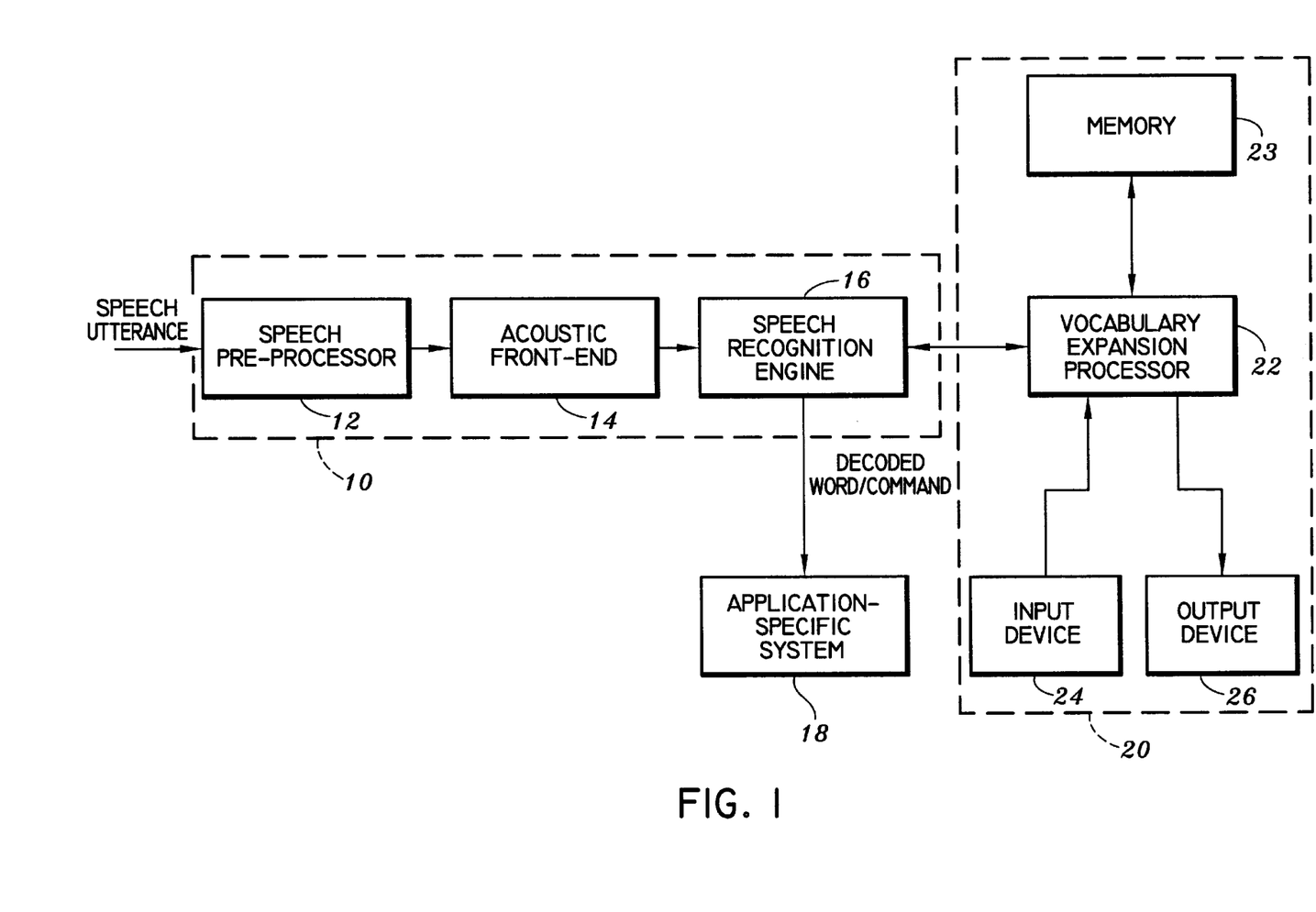
FIG. 1 is a block diagram of a speech recognition system in conjunction with an application-specific system and a vocabulary expansion facility according to the present invention.

Referring initially to FIG. 1, a block diagram is shown of: a speech recognition system 10 operatively coupled to an application-specific system 18 and a vocabulary expansion facility 20 according to the present invention. The speech recognition system 10, itself, includes a speech utterance pre-processor 12, an acoustic front-end 14 operatively coupled to the pre-processor 12, and a speech recognition engine 16 operatively coupled to the acoustic front-end 14. It is to be appreciated that the present invention is usable with any speech recognition system and is not, in any way, limited to use with or dependent on any details or methodologies of any particular speech recognition arrangement. For instance, even generalized speech recognition systems such as the commercially available large vocabulary IBM ViaVoice or ViaVoice Gold systems may be adapted to permit and/or perform vocabulary expansion functions in accordance with the invention. In any case, it should be understood that the elements illustrated in FIG. 1 may be implemented in various forms of hardware, software, or combinations thereof. As such, the main recognition elements (e.g., speech recognition engine) and the vocabulary expansion processor are implemented in software on one or more appropriately programmed general purpose digital computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 1 may be considered to include a suitable and preferred processor architecture for practicing the invention which may be achieved by programming the one or more general purpose processors. Of course, special purpose processors may be employed to implement the invention. The speech recognition engine 16 and vocabulary expansion processor 22 are, therefore, functional blocks illustrating the computer facility or facilities executing their respective functions. Memory 23 and input and output devices 24 and 26 are preferably part of the computer facility implementing the functions of the processor 22. Also, the speech pre-processor 12 and/or the acoustic front-end 14 may be implemented via a digital signal processor operatively coupled to such computer facilities (e.g., via the computer interface bus), as is known in the art. Given the teachings of the invention provided herein, one of ordinary skill in the related art will be able to contemplate these and similar implementations of the elements of the invention.

A brief explanation of the functionality of the components of the speech recognition system 10 will now be given. The speech utterance pre-processor 12 receives the speech uttered by a speaker and generates representative speech waveforms. The speech utterance pre-processor 12 may include an audio-to-analog transducer (microphone) and an analog-to-digital converter which respectively transduce the utterances into an electrical signal and then convert the electrical signal into a digital signal representative of the speech uttered. Further, the pre-processor may preferably sample the speech signal and partition the signal into overlapping frames so that each frame is discretely processed by the remainder of the system. The output signal of the pre-processor 12 is the sampled speech waveforms which are provided to an acoustic front-end 14. Alternatively, the acoustic front-end 14 may incorporate the functions of the pre-processor 12.

The acoustic front-end 14 receives the speech waveforms and, as is known in the art, generates feature vectors (signals) therefrom. Physiologically related mel cepstra, delta and delta-delta feature vectors are preferred for efficiency and effectiveness of recognition, although other known feature vectors may be used.

Next, as is known, the speech recognition engine 16 uses the feature vectors provided by the acoustic front-end 14 to perform the process of decoding the word or words uttered by the speaker. The decoded word(s) is then presented to the application-specific system 18. It is to be understood that the application-specific system 18 may be any system that employs the decoded speech signals as input. For example, the system 18 may be a telephone voice dialing system whereby the spoken utterances received by the speech recognition system 10 represent user commands, names of persons to be dialed, etc. By way of another example, the system 18 may be a security access controller which selectively permits or denies access to a facility or service whereby the spoken utterances received by the speech recognition system 10 represent passwords, user identification information, etc. Of course, the above applications are merely examples and, as such, the present invention is not intended to be limited thereby.

Figure 2:
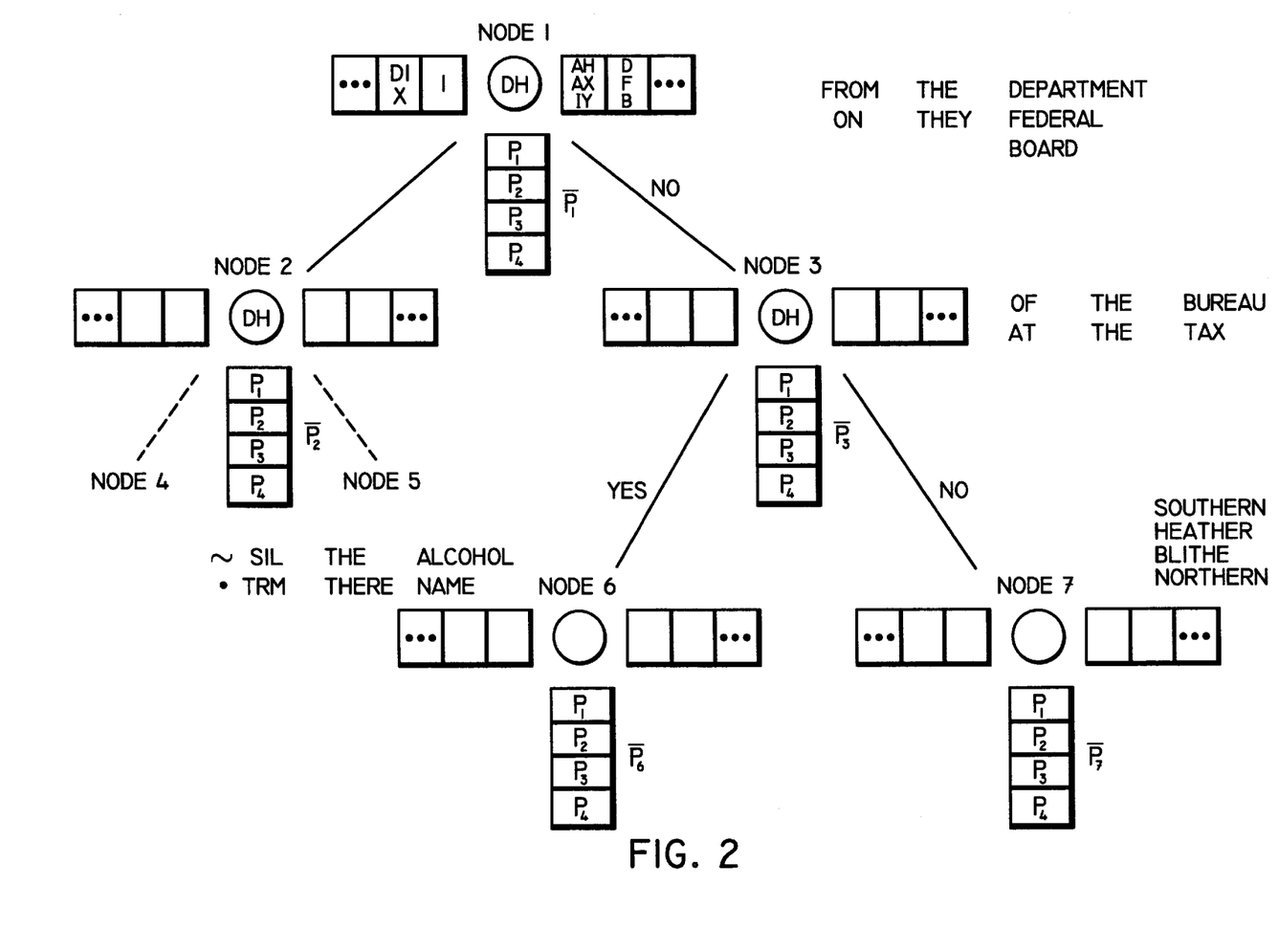
FIG. 2 is a diagram illustrating an example of a decision tree employed in an embodiment of a speech recognition engine.

In a preferred embodiment of the speech recognition engine 16, a decision tree model for each phone in the system is created. Referring to FIG. 2, an illustration of a hierarchical decision tree is shown. The leaves of this tree represent different contexts for each phone. The leaves contain a mixture gaussian prototype typically with 10 mixtures, each mixture with 39 dimensions. In this embodiment, there are fifty-one phones, and each phone has three such trees. Each tree is trained by a set of questions which segment the data. The result is a set of mixture gaussians:

$\bar{P}_1, \bar{P}_2, \ldots, \bar{P}_N$ which can be compared as sequences of such prototypes associated to the words. However, the method by which the speech recognition system is trained is not critical to the present invention, as a result, any conventional method may be employed. For example, the systems and methods disclosed in the following articles may be employed: L. R. Bahl et al., "A Fast Approximate Acoustic Match for Large Vocabulary Speech Recognition," IEEE Transactions on Speech and Audio Processing, vol. 1, no. 1, pp 59–67, January 1993 and in L. R. Bahl et al., "Performance of the IBM Large Vocabulary Continuous Speech Recognition System on the ARPA Wall Street Journal Task," ICASSP 1995, vol 1, pp 41–44. The present invention also assumes that the speech recognition engine 16 includes a large vocabulary along with the corresponding lefeme tree and baseforms.

Referring again to FIG. 1, the vocabulary expansion facility 20 of the invention is shown to include an expansion processor 22, operatively coupled to the speech recognition engine 16, memory 23 operatively coupled to the expansion processor 22, and an input device 24 and an output device 26, both operatively coupled to the expansion processor 22. As previously mentioned, it is to be understood that the operations performed in accordance with the expansion processor 22, to be described below, are preferably accomplished via one or more software modules executed on one or more appropriately programmed general purpose digital computers, for example, as described above. As such, the input device 24 may include a standard keyboard or other conventional means for inputting new words into the vocabulary expansion facility 20 and the speech recognition engine 16. Also, the output device 26 may be a visual display (e.g., CRT) which allows the person inputting the new vocabulary words (e.g., application developer) to review the results of the operations performed by the vocabulary expansion facility of the invention. That is, the display serves to provide the user with, inter alia, information concerning the potential for acoustic confusion between the proposed new vocabulary word and one or more existing vocabulary words. The output device 26 may also be a printer. Alternatively, the output device 26 may be a Text-to-Speech (TTS) system which takes the results produced by the expansion processor 22 and synthesizes them into speech for audible indication to the user, rather than just visual indication. Any conventional TTS system may be employed for output device 26. As mentioned, the input and output devices are preferably part of the computer system performing the functions of the expansion processor 22. Also, memory 23 is preferably part of the same computer system and is used in cooperation with the functional software modules executed by processor 22, as will be explained.

Figure 3:
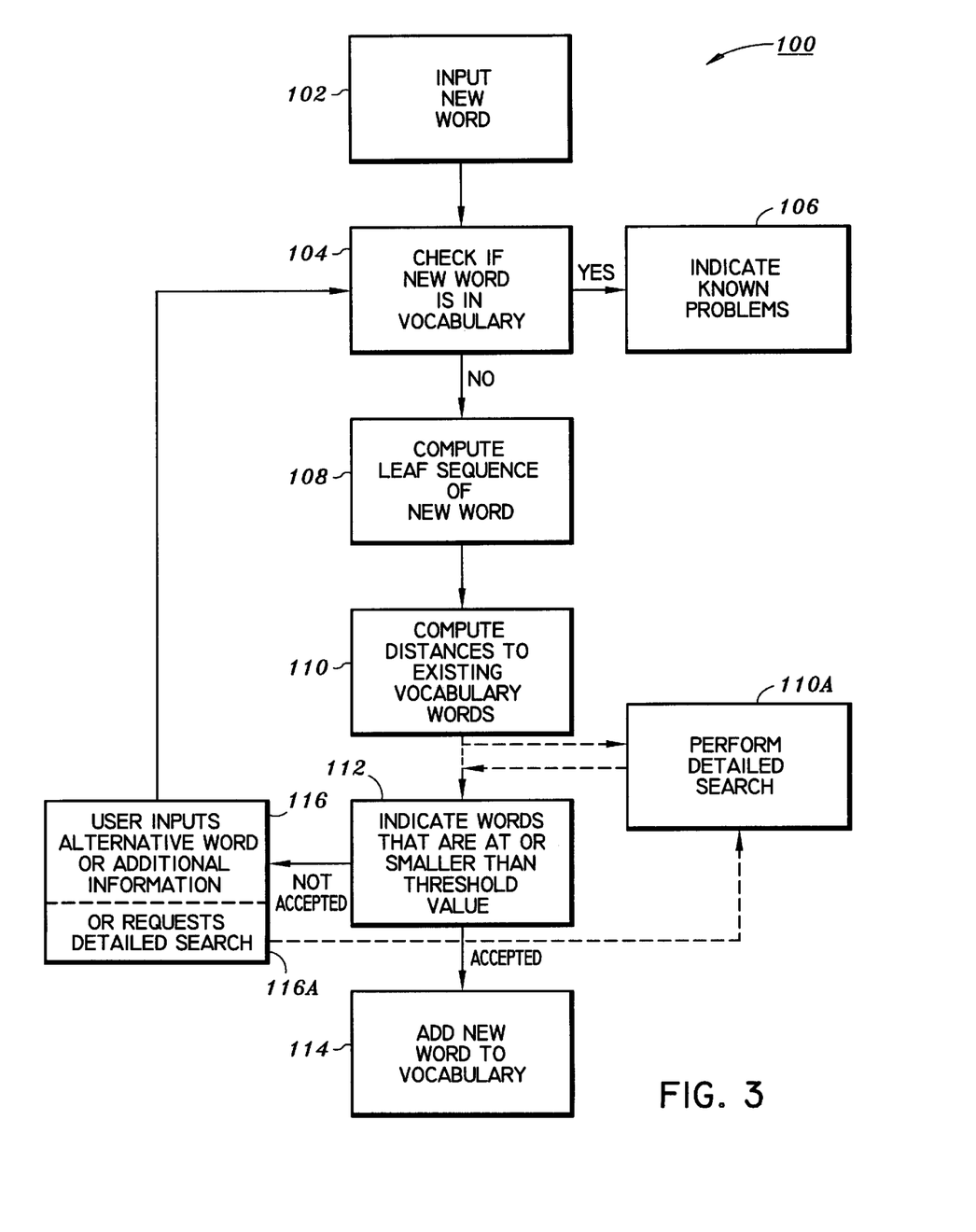
FIG. 3 is a flow chart illustrating an embodiment of a method of vocabulary expansion according to the present invention.

A detailed description of a preferred method of expanding the vocabulary of the speech recognition engine, while minimizing acoustic confusion, performed by the vocabulary expansion facility 20 will now be given in the context of FIG. 3.

It is to be understood that one typical reason that the vocabulary of the speech recognition engine 16 would need to be expanded is due to the fact that the application-specific system 18 has been modified to be responsive to new words or commands. Such new words or commands could be defined and added to the speech-related application either automatically (e.g., by deciphering an HTML web page) or manually (e.g., by a script writer entering the appropriate script commands via keyboard, mouse, voice, etc.). Thus, in order for the speech recognizer 10 to be able to decode the new word or command, the word or command must be added to the vocabulary of the speech recognition engine 16.

It should be appreciated that more than one word may be input such that the words form a phrase. Thus, while the following description explains the invention in terms of a single word or command, it is to be understood that a phrase may be entered by a user, and the expansion facility may process each word separately, but in context, and results may be displayed to the user for individual words and/or for the entire phrase, as a whole.

Accordingly, at step 102, the new word (or command) is input to the expansion facility 20 via the input device 24. The new word is preferably input as a baseform. As is known, the baseform of a word is a sequence of phonetic units (e.g., phones) that make up the word. Examples of baseforms for given words may be:

| | |
|---|---|
| REJECTION | R IX JH EH K SH AX N |
| REPEAT | R IX P IY TD |
| RETURN | R IX T ER N |
| RETURN | R IY T ER N |
| REVIEW | R IX V Y UW |
| REVIEW | R IY V Y UW |
| SCREENING | S K R IY N IX NG |
| THAT | DH AE TD |
| TRACE | T R EY S |
| TRAILS | T R EY L S |
| WAITING | W EY DX IX NG |

Some words may have more than one baseform depending on how they are pronounced. For instance, the word "RETURN" may be pronounced with the "E" being a short vowel (IX) or a long vowel (IY). The same is true for the word "REVIEW", as well as many other words for that matter. Nonetheless, the baseform for the new word may be input in a variety of ways, for example, via a keyboard or by being read from a previously-created diskette containing the baseforms for various words. Alternatively, the baseform may be input from a speech synthesizer included as part of the input device 24. It is known that conventional speech synthesizers include a spelling-to-sound section in which the baseform of a word is formed. Accordingly, the output of the spelling-to-sound section may be provided to the processor 22 in order to provide the processor with the necessary baseform for the new word. Nonetheless, the input word is stored in memory 23 by the expansion processor 22.

Furthermore, it is to be understood that each existing word in the speech recognition engine 16 has one (or more) baseforms respectively associated therewith. These baseforms for the existing words may be previously read from the engine 16 by the expansion processor 22 and also stored in memory 23. While not critical to the invention, such existing baseforms may be read and permanently stored in memory 23 (e.g., in which case memory 23 could be ROM or hard disk memory) prior to any new words being added to the engine or read and temporarily stored in memory 23 (e.g., in which case memory 23 could be RAM) at the time a new word is to be added.

It is to be appreciated that the use of baseforms is preferred so that a leaf sequence may also be associated with the baseform for each of the existing words. It is the leaf sequences that are used to determine the degree of acoustic confusibility that arises with the introduction of a new word, as will be explained. As is known, a leaf fitting the current phonetic context is extracted from the appropriate decision tree model for each phone of the baseform. Accordingly, a leaf sequence corresponding to the baseform is formed. The leaf sequences for the existing words are preferably previously generated. If generated by the speech recognizer 10, they are read from the recognizer memory by expansion processor 22 and stored in memory 23. If not, the expansion processor 22 may generate the leaf sequences for the existing words directly from their baseforms and then store them in memory 23. The manner in which the leaf sequences of the words are generated is not critical to the invention.

Next, at step 104, the expansion processor 22 compares the baseform of the new word (input in step 102) to the baseforms of the existing words to determine if the newly added word already exists in the vocabulary of the recognition engine. If it does, then the processor 22 may send a message to the output device 26 (e.g., a display or a TTS system) to inform the user that the word already exists and it does not need to be added to the engine. However, if the word has a history (which may have been catalogued by the recognizer 10 or processor 22 during prior decoding sessions) of being erroneously decoded, the processor 22 may also display (step 106) a message to the user indicating the known problems (e.g., input word has previously been confused with certain existing words a certain percentage of the time) with the word input by the user. The user may then choose and input an alternative word.

If, in step 104, it is found that the newly input word is not in the existing vocabulary, then the expansion processor 22 computes the leaf sequence for the new word (step 108). As mentioned above and as is known, the leaves from the appropriate decision tree models are extracted for the baseform of the new word, given the current context of each phone of the word. It is to be understood that the processor 22 may utilize the acoustic models of the recognizer 10 to extract the leaf sequence of the new word.

Next, in step 110, the lefeme sequence of the new word is compared to the lefeme sequences of the existing words from the recognition engine vocabulary. It is to be appreciated that from this comparison, a set of confusible words (i.e., words with pronunciation sequences too close to the new word) is identified. This list or set of "forbidden" or at least "not recommended" words is then made available to the user for inspection. Thus, instead of the user having to transcribe a large amount of data to see the potential acoustic confusibility associated with the new word, the user is presented with a list of acoustically similar words from the existing vocabulary and respective measures of similarity to the new word and, thus, can avert decoding problems by choosing an alternate word. Alternatively, as will be explained, rather than choosing an alternate word, the user can add some additional information (e.g., indicate that the new word is a noun or a verb; give examples of sentences including the new word where it appears to modify the language models of the speech recognition engine) about the originally input new word. This information will therefore serve to distinguish the new word from the other existing confusible words according to usage.

The step of comparing the new input word to all existing vocabulary words (step 110) to determine potential acoustic confusibility may be accomplished in many ways. A preferred manner involves aligning the new word and the existing words in the vocabulary and then calculating respective distance measures or scores therebetween. The distance measure associated with the new word and any one word from the vocabulary is preferably generated by respectively comparing leaves from the lefeme sequence of the new word with leaves from the lefeme sequence of the existing word. A measure or score is generated for each pair-wise leaf comparison and the total distance measure for the words is calculated by adding up the pair-wise leaf scores.

The alignment process performed by the expansion processor 22 also preferably handles comparisons of unequal words. That is, a new word may have more or less phones comprising its baseform than a particular existing word. In this event, comparison is still possible by implementing a best alignment process between the words. An example of such a best alignment process is the well-known Viterbi algorithm. The Viterbi alignment process supposes that since the acoustic models of the speech recognition engine are aligned left to right against incoming speech vectors, then when performing distance calculations to find the best match of leaves of a first word to those of a second word, left to right alignment will ensure a best match regardless if the baseforms are unequal in the number of phones.

An example of phonetically unequal length words is as follows:

| TRACE  | TR EY S   |
|--------|-----------|
| TRAILS | TR EY L S |

The words "TRACE" and "TRAILS" are unequal in phonetic length because they are different by a phone. Another example of the need for an alignment algorithm is in comparing such words as "AUSTIN" and "BOSTON", given several different baseforms for each word. For instance, such possible baseforms may be:

| AUSTIN   | AA S T AX N   |
| AUSTIN   | AO S T AX N   |
| AUSTIN'S | AO S T IX N S |
| BOSTON   | B AA S T AX N |
| BOSTON   | B AO S T AX N |

Accordingly, in order to generate distance measures, the processor 22 preferably implements Viterbi alignment in order to match such words of unequal phonetic length.

The distance measures calculated by the expansion processor 22 for the comparisons between the new word and the existing words are preferably tabulated. The tabular format may be organized in ranks based on an acoustic confusibility threshold value (or values) established within the processor 22. These values can be set by a user prior to real-time use of the expansion facility. If, for example, a single threshold value is set, then any new word which results in a distance measure falling at or below the threshold value results in the new word being identified as likely to cause confusion with the associated existing word. Likewise, if the new word results in a distance measure falling above the threshold value, then the new word is identified as not likely to cause confusion with the associated existing word. Of course, the level of "not likely to cause confusion" could easily be set to include measures at or above the threshold value, while the "likely to cause confusion" level is set to include measures below the threshold value.

Preferably, since the user is interested in knowing the existing words that are likely to be confused for the new word, only the comparisons falling in the "likely to cause confusion" group are indicated to him (step 112). However, the entire table of comparisons can just as easily be provided to the output device 26.

Also, it is to be appreciated that the number of comparisons of the new word to existing words may be reduced such that only a subset of all existing words are compared to the new word. This may be accomplished in several ways. For example, if the new word is to be only used as a verb, this could be identified at the input stage (step 102) and, as a result, the processor 22 would only compare the new word to existing words capable of being verbs, provided that the existing words were also previously so categorized or identified.

Nonetheless, an example of such tabular results generated during step 110 is given below:

| WORD 1 | LEFEME SEQUENCE # | WORD 2 | LEFEME SEQUENCE # | DISTANCE MEASURE |
|---|---|---|---|---|
| LAWYER | (47690) | MOYER | (31513) | 1607.54 |
| LAWYER | (47690) | ROYER | (38483) | 1898.11 | where "WORD 1" is the new word being tested, "WORD 2" are the existing words, and "DISTANCE MEASURE" is the distance measure or score resulting from lefeme sequence comparison. The distance measure may be a unitless, relative number depending on the type of distance metric employed. The "LEFEME SEQUENCE #" is merely an index number assigned to each lefeme sequence. If, for example, the acoustic confusibility threshold value were set at 1500.00, then neither "ROYER" or "MOYER" would be considered as potentially acoustically confusing with respect to the word "LAWYER", since their distance measures fall above the threshold value. Thus, the new word can be safely added with a confidence level that acoustic confusion will likely not occur. Because, in this case, there is no tabular data displayed to the user, the user may merely be prompted to confirm the addition or the addition may be automatically done.

However, consider the following tabular result example:

| WORD 1 | LEFEME SEQUENCE # | WORD 2 | LEFEME SEQUENCE # | DISTANCE MEASURE |
|---|---|---|---|---|
| LAYDEN | (32228) | LAYDON | (31518) | 1168.42 |
| LAYDEN | (32228) | LAYTEN | (31526) | 0.00000 |
| LAYDEN | (32228) | LEIGHTON | (31793) | 0.00000 |
| LAYDEN | (32228) | LEYTON | (31517) | 0.00000 |

In this case, the new word "LAYDEN" is compared to all existing words and the words "LAYDON", "LAYTEN", "LEIGHTON" and "LEYTON" represent words that fall below the threshold value of 1500.00. In fact, the latter three words result in a distance measure of 0.00000 meaning that the new word and these words all have the same baseforms.

Thus, at step 112, the user is presented with a table similar to the immediately preceding table. In this way, he can make a determination as to whether the addition of his proposed word to the speech recognition engine vocabulary will likely result in acoustic confusion during decoding sessions in conjunction with the application-specific system 18. The user is then prompted to add an alternative word or additional information pertaining to the originally input word, as previously mentioned. The processor, through the output device, may also give the user the option to include the new originally input word anyway, if the user sees that the word is near the threshold (e.g., near 1500.00) and he is willing to take the risk of acoustic confusion.

The present invention also preferably includes the capability to provide the speech recognition engine with an instruction to exclude any competing (i.e., identified as acoustically confusing) existing words from the active vocabulary during real-time decoding when the new word is uttered. That is, the user can input a command to the processor 22 indicating that he wishes to add the originally input word to the vocabulary but, in order to avoid acoustic confusion, to temporarily exclude the identified competing existing words.

It is to be understood that, based on experiments, distance ranges can be provided for safe, troubling and confusing words. In this case, the table would be set up to rank results in accordance with more than one threshold (i.e., the respective threshold values that separate the "safe", "troubling", and "confusing" categories).

Accordingly, whenever a word is compared, the user can review the "troubling" or "confusing" tables or lists, ranked according to distance, and thus predict the level of acoustic confusion that will or may occur. Also, on a given vocabulary, the expansion facility can be run to predict potential difficulties or try to fix observed errors.

It is to be appreciated that the selection of a distance metric for calculating the distance measures is arbitrary and, as a result, different distance metrics may be employed in accordance with the invention. Thus, the distance metrics below are merely examples of known measuring techniques and are not intended to limit the invention.

The Kuhlback-Liebler distance metric is modified to work with Gaussian mixtures by going through the set of mixtures in a first class and finding the minimum distance to a second class. Then, the total distance between the first class element (that had the minimal distance to a member of the second class) to all members of the second class is computed. Note that the weight of the mixture is used here to differentiate the relative importances of the members of the first class. The same procedure is done to elements of the second class. Then, the total distance between the first class and the second class is the sum of these distances. Other examples of distance metrics which may be employed are the L2 distance metric and the Mahalnobis or weighted Euclidian distance metric, to name a few.

This procedure is carried out for all leaves in the system and a symmetric matrix such as is shown below is produced identifying all the pair-wise distances between leaves. The distance matrix is subsequently used to find the total distance between two words. An example of such a symmetric matrix is as follows:

| 0 | 266.913 | 3210.71 | 8778.35 | 1834.3 |
|---|---|---|---|---|
| 266.913 | 0 | 3099.7 | 12318.4 | 1668.16 |
| 3210.71 | 3099.7 | 0 | 1583.21 | 1896.43 |
| 8778.35 | 12318.4 | 1583.21 | 0 | 891.11 |
| 1834.3 | 1668.16 | 1896.43 | 891.11 | 0 |

In this example, the first column and row represent leaf number 1. The second column and row represent leaf number 2, and so on. Therefore, the diagonal zeros (0) represent the fact that the leaf distance to itself is zero and the matrix is symmetric because the distance from leaf 2 to leaf 1 is the same as the distance from leaf 1 to leaf 2.

Nonetheless, regardless of the distance metric employed, if there are no words which fall at or below the acoustic confusibility threshold value, then the new word (preferably including baseform and lefeme sequence) is added to the vocabulary (step 114). The user may be required to acknowledge (confirm) the addition of the new word to the vocabulary or the word may be automatically added.

However, if a new word is identified as potentially acoustically confusible with one or more existing words, the processor 22 then presents this information to the user and prompts the user to enter an alternative word (step 116). The alternative new word is then processed in a similar manner as explained above, starting from step 104, in order to obtain new results. Also, as previously mentioned, the user may choose to input additional contextual information regarding the word originally input, rather than abandoning such word and choosing an alternative word. For example, the user may indicate that the word is a verb or a noun, or may provide an example of usage in a sentence. The originally input word with the additional contextual information is then processed, starting from step 104, in order to obtain new results. Also, as previously explained, the user may request that the new word be added but the competing existing words be temporarily excluded during a decoding session including that new word.

Alternatively, at step 116A, the user can choose to indicate (via the input device 24) to the vocabulary expansion processor 22 that an additional, more detailed search 110A is necessary. That is, depending on the depth that the initial comparison between the new word and existing vocabulary words was performed, the results may not be satisfactory to the user and, as such, he may choose to have the expansion processor 22 perform a deeper search. It is to be appreciated that the depth of the search is controlled by the beamwidth in the Viterbi algorithm for the selected words. Thus, upon the request from the user, the processor 22 increases the beamwidth and the deeper search is performed. In this manner, the processor is increasing the scope of the comparison and thus preventing errors (e.g., failure to identify acoustically confusing words from the existing vocabulary) that may occur from a less detailed search. The user is then presented with the results of the more detailed search (step 112).

Still further, in yet another alternative embodiment, the processor 22, itself, may automatically make a determination that a more detailed search is necessary. This is possible by presetting, in the processor 22, ranges of measures which, if reached in step 110, trigger the processor to increase the beamwidth of the Viterbi algorithm and then perform the deeper search 110A. In this case, the user is only presented with the results of the more detailed search (step 112).

Furthermore, given the inventive vocabulary expansion facilities of the invention, a user (such as, for example, an application developer) has many options to overcome the potential acoustic confusion. He can provide a synonym of the new, but acoustically confusing, word; coerce the grammar associated with the acoustically confusing word; modify the interface (e.g., provide capability for asking user to confirm the new word or command); or modify the set of options in that particular context (e.g., limit the active vocabulary to exclude the competing existing word or command).

As previously mentioned, rather than present the user with results from the vocabulary expansion facility on a visual display, a TTS system may be employed to provide spoken results to the user. In this way, the present invention finds advantageous uses in telephone applications.

It is to be appreciated that, given the teachings herein, one of ordinary skill will contemplate many and varied applications for the vocabulary expansion facility of the present invention. By way of example only, the present invention may complement or be integrated with IBM's ViaVoice or ViaVoice Gold software, speech toolkits, and research engines. In fact, any applications where new words are added to a speech recognizer are contemplated, including any English or foreign language speech recognition system or even any multi-lingual speech recognition system.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for adding words to a vocabulary of a speech recognition engine, the method comprising the steps of:
   (a) inputting at least one new word;
   (b) computing an acoustic similarity measure between the at least one new word and each word of at least a portion of existing vocabulary words, wherein the step of computing an acoustic similarity measure comprises the steps of:
      computing a leaf sequence for the at least one new word;
      comparing the leaf sequence for the at least one new word to respective leaf sequences associated with the at least a portion of the existing words; and
      generating respective distance measures in response to the comparisons, the respective distance measures indicative of acoustic distances between the compared leaf sequences, wherein the respective distance measures are calculated via a Kuhlback-Liebler distance metric;
   (c) if at least one of the computed acoustic similarity measures is within a threshold range, identifying the at least one new word as being potentially acoustically confusing with an existing vocabulary word, indicating results associated with the at least one computed acoustic similarity measure and prompting a user to input an alternative word or additional information pertaining to the at least one new word; and
   (d) if none of the computed acoustic similarity measures are within the threshold range, adding the at least one new word to the vocabulary.

2. The method of claim 1, further comprising the step of checking whether the at least one new word already exists within the vocabulary, prior to computing the acoustic similarity measures.

3. The method of claim 2, further comprising the step of indicating previously accumulated information relating to the at least one new word, if the at least one new word already exists within the vocabulary, the accumulated information comprising previously catalogued decoding problems associated with the word.

4. The method of claim 1, wherein the leaf sequence comparison step further comprises performing a best match alignment process between leaf sequences of unequal phonetic length.

5. The method of claim 1, wherein the additional information pertaining to the at least one new word includes contextual information.

6. The method of claim 1, wherein the additional information pertaining to the at least one new word includes an instruction by the user to temporarily exclude the existing word associated with a measure within the threshold range from the vocabulary when the at least one new word is uttered in a real-time decoding session.

7. The method of claim 1, wherein the indicating step comprises displaying the results to the user, the results comprising the at least one acoustic similarity measure and the corresponding existing vocabulary word.

8. The method of claim 1, wherein the indicating step comprises speech synthesizing the results for playback to the user.

9. The method of claim 1, wherein the indicating step further comprises a step of prompting the user to request an additional search to provide increased identification of potentially acoustically confusing words in the vocabulary.

10. The method of claim 9, wherein the additional search includes increasing a beamwidth associated with a Viterbi algorithm performed during the search.

11. The method of claim 1, further comprising, between steps (b) and (c), the step of performing an additional search to provide increased identification of potentially acoustically confusing words in the vocabulary, if at least one of the acoustic similarity measures is within a threshold range, the additional search including increasing a bandwidth associated with a Viterbi algorithm performed during the search.

12. The method of claim 1, wherein the inputting step comprises providing at least one baseform associated with the at least one new word.

13. The method of claim 12, wherein the at least one baseform is provided via a speech synthesizer.

14. Computer-based apparatus for adding words to a vocabulary of a speech recognition engine, the apparatus comprising:

an input device for inputting at least one new word;

a processor, operatively coupled to the input device, for computing an acoustic similarity measure between the at least one new word and each word of at least a portion of existing vocabulary words; and an output device operatively coupled to the processor, wherein the output device comprises a text-to-speech system;

wherein if at least one of the computed acoustic similarity measures is within a threshold range, the processor generates output results associated with the at least one computed acoustic similarity measure to identify the at least one new word as being potentially acoustically confusing with an existing vocabulary word, wherein the processor causes speech synthesis of the results for playback to the user via the text-to-speech system and causes a prompting of the user to input an alternative word or additional information pertaining to the at least one new word;

and wherein if none of the computed acoustic similarity measures are within the threshold range, the processor causes the at least one new word to be added to the vocabulary.

15. The apparatus of claim 14, wherein the processor further checks whether the at least one new word already exists within the vocabulary, prior to computing the acoustic similarity measures.

16. The apparatus of claim 15, wherein the processor further causes an output of previously accumulated information relating to the at least one new word, if the at least one new word already exists within the vocabulary, the accumulated information comprising previously catalogued decoding problems associated with the word.

17. The apparatus of claim 14, wherein the processor further performs the steps of:

(a) computing a leaf sequence for the at least one new word;

(b) comparing the leaf sequence for the at least one new word to respective leaf sequences associated with the at least a portion of existing words; and (c) generating respective distance measures in response to the comparisons, the respective distance measures indicative of acoustic distances between the compared leaf sequences.

18. The apparatus of claim 17, wherein the processor further performs a best match alignment process between leaf sequences of unequal phonetic length.

19. The apparatus of claim 17, wherein the processor calculates the respective distance measures via a Kuhlback-Liebler distance metric.

20. The apparatus of claim 14, wherein the additional information pertaining to the at least one new word includes contextual information.

21. The apparatus of claim 14, wherein the additional information pertaining to the at least one new word includes an instruction by the user to temporarily exclude the existing word associated with a measure within the threshold range from the vocabulary when the at least one new word is uttered in a real-time decoding session.

22. The apparatus of claim 14, wherein the output device is a display and further wherein the processor causes display of the results to the user on the display, the results comprising the at least one computed acoustic similarity measure and the corresponding existing vocabulary word.

23. The apparatus of claim 14, wherein the processor causes prompting of the user to request an additional search to provide increased identification of potentially acoustically confusing words in the vocabulary.

24. The apparatus of claim 23, wherein the additional search includes increasing a beamwidth associated with a Viterbi algorithm performed during the search.

25. The apparatus of claim 14, wherein the processor, prior to generating the output results to the user, performs an additional search to provide increased identification of potentially acoustically confusing words in the vocabulary, if at least one computed acoustic similarity measure is within a threshold range, the additional search including increasing a beamwidth associated with a Viterbi algorithm performed during the search.

26. The apparatus of claim 14, wherein the input device comprises means for inputting at least one baseform associated with the at least one new word.

27. The apparatus of claim 26, wherein the inputting means is a speech synthesizer.

28. A program storage device, readable by a machine, tangibly embodying a program of instructions executable by the machine to perform method steps for adding words to a vocabulary of a speech recognition engine, the method comprising the steps of:

(a) receiving as input at least one new word;

(b) computing an acoustic similarity measure between the at least one new word and each word of at least a portion of existing vocabulary words;

(c) if at least one of the computed acoustic similarity measures is within a threshold range, identifying the at least one new word as being potentially acoustically confusing with an existing vocabulary word, indicating results associated with the at least one computed acoustic similarity measure, wherein the indicating step comprises speech synthesizing the results for playback to the user, and prompting a user to input an alternative word or additional information pertaining to the at least one new word; and (d) if none of the computed acoustic similarity measures are within the threshold range, adding the at least one new word to the vocabulary.

29. A method for adding words to a vocabulary of a speech recognition engine, the method comprising the steps of:

(a) receiving as input at least one new word, wherein the step of receiving as input comprises providing at least one baseform associated with the at least one new word, wherein the at least one baseform is provided via a speech synthesizer;

(b) computing an acoustic similarity measure between the at least one new word and each word of at least a portion of existing vocabulary words;

(c) if at least one of the computed acoustic similarity measures is within a threshold range, identifying the at least one new word as being potentially acoustically confusing with an existing vocabulary word, indicating results associated with the at least one computed acoustic similarity measure and prompting a user to input an alternative word or additional information pertaining to the at least one new word; and (d) if none of the computed acoustic similarity measures are within the threshold range, adding the at least one new word to the vocabulary.

* * * * *